United States Patent
Hata et al.

(10) Patent No.: US 7,384,622 B2
(45) Date of Patent: Jun. 10, 2008

(54) ZEOLITE NANO-CRYSTAL SUSPENSION, ZEOLITE NANO-CRYSTAL PRODUCTION METHOD, ZEOLITE NANO-CRYSTAL SUSPENSION PRODUCTION METHOD, AND ZEOLITE THIN FILM

(75) Inventors: Nobuhiro Hata, Tsukuba (JP); Guoqing Guan, Tsukuba (JP); Takenobu Yoshino, Tsukuba (JP); Syozo Takada, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 347 days.

(21) Appl. No.: 11/212,844

(22) Filed: Aug. 29, 2005

(65) Prior Publication Data

US 2006/0063662 A1    Mar. 23, 2006

(30) Foreign Application Priority Data

Aug. 31, 2004   (JP)   ............................. 2004-252498

(51) Int. Cl.
*C01B 39/36* (2006.01)
*C01B 37/02* (2006.01)

(52) U.S. Cl. .................................. 423/700; 423/707
(58) Field of Classification Search ................ 423/700, 423/707
See application file for complete search history.

(56) References Cited

U.S. PATENT DOCUMENTS

| | | | |
|---|---|---|---|
| 6,573,131 B2* | 6/2003 | Yan et al. ................ | 438/207 |
| 2002/0041970 A1* | 4/2002 | Gaynor ..................... | 428/447 |
| 2007/0189961 A1* | 8/2007 | Iacopi et al. .............. | 423/702 |

FOREIGN PATENT DOCUMENTS

| | | |
|---|---|---|
| JP | 2003-249495 | 9/2003 |
| JP | 2004-504716 | 2/2004 |
| JP | 2004-79582 | 3/2004 |
| JP | 2004-149714 | 5/2004 |
| JP | 2004-153147 | 5/2004 |

(Continued)

OTHER PUBLICATIONS

Zhengbao Wang, et al., "Pure-Silica Zeolite Low-k Dielectric Thin Films", Advanced Materials, vol. 13, No. 10, (May 17, 2001), pp. 746-749.

(Continued)

*Primary Examiner*—David M Brunsman
(74) *Attorney, Agent, or Firm*—Oblon, Spivak, McClelland, Maier & Neustadt, P.C.

(57) ABSTRACT

A zeolite suspension contains MEL-type zeolite nanocrystals as a principal component. A method for the production of MEL-type zeolite nanocrystals includes the steps of aging a synthesized solution comprising TEOS, TBAOH, water and alcohol and subjecting the aged solution to hydrothermal crystallization treatment at a predetermined temperature. A method for the production of a zeolite suspension includes the steps of aging a synthesized solution comprising TEOS, TBAOH, water and alcohol, subjecting the aged solution to hydrothermal crystallization treatment to produce MEL-type zeolite nanocrystals and mixing a composition having a surfactant dissolved in at least one organic solvent or a mixed solvent of alcohol-based organic solvents, amide-based organic solvents and ketone-based organic solvents with a zeolite nano-crystal suspension containing the MEL-type zeolite nanocrystals to produce a zeolite suspension.

19 Claims, 6 Drawing Sheets

FOREIGN PATENT DOCUMENTS

WO        WO 02/07191 A2     1/2002
WO        WO 2004/026765 A1     4/2004

OTHER PUBLICATIONS

Zhengbao Wang, et al., "Pure-Silica Zeolite Low-k Dielectrics by Spin-On of Nanoparticle Suspensions", Advanced materials, vol. 13, no. 19, (Oct. 2, 2001), pp. 1463-1466.

Shuang Li, et al., "Ultra-Low-k Pure-Silica Zeolite MFI Films Using Cyclodextion as Porogen", Advanced Materials, vol. 15, No. 18, (Sep. 16, 2003), pp. 1528-1531.

O. Larlus, et al., "Silicalite-1/polymer films with low-k dielectric constants", Elsevier, Applied Surface Science, 226, (2004) pp. 155-160.

Miki Egami, "Properties of Porous Silica Films for Semiconductor Device", Science and Industry, 77 (11), (2003), pp. 582-587, with partial English translation.

* cited by examiner

ZEOLITE NANO-CRYSTAL SUSPENSION, ZEOLITE NANO-CRYSTAL PRODUCTION METHOD, ZEOLITE NANO-CRYSTAL SUSPENSION PRODUCTION METHOD, AND ZEOLITE THIN FILM

BACKGROUND OF THE INVENTION

1. Field of the Invention

The present invention relates to a zeolite suspension used as a precursor for an interlayer dielectric film in next-generation semiconductor devices, a zeolite nano-crystal production method, a zeolite suspension production method and a zeolite thin film.

2. Description of the Prior Art

Zeorites are inorganic microporous crystalline materials. Their pore size is extremely uniform. Compared with conventional mesoporous silica with amorphous nature, zeolites have a better local order (ordered structure) and are therefore excellent in chemical stability, mechanical strength and heat conductivity. While aluminosilicate zeolites are hydrophilic, pure-silica zeolites are hydrophobic and adsorb little water.

As regards zeolites, there are the following prior art references in which MFI-type pure-silica zeolites are reported as being usable as excellent materials of low relative permittivity.
1. U.S. Pat. No. 6,573,131
2. U.S. Pat. No. 6,630,696
3. PCT-A2004-504716
4. JP-A2003-249495
5. JP-A 2004-79582
6. U.S. Pat. No. 6,533,855
7. U.S. Pat. No. 6,566,243
8. U.S. Pat. No. 6,660,245
9. U.S. Pat. No. 6,329,062
10. JP-A2004-149714
11. JP-A2004-153147
12. PCT-A2004-26765
13. Z. Wang, H. Wang, A. Mitra, L. Huang, Y. Yan, Pure-silica zeolite low-k dielectric thin films, Advanced Materials, 13 (10), 2001, pp. 746-749
14. Z. Wang, A. Mitra, H. Wang, L. Huang, Y. Yan, Pure silica zeolite films as low-k dielectric by spin-on of nanoparticle suspensions, Advanced Materials, 13 (19), 2001, pp. 1463-1466
15. S. Li, Z. Li, Y. Yan Ultra-low-k pure-silica zeolite MFI films using cyclodextrin as porogen, Advanced Materials, 15 (18), 2003, pp. 1528-1531
16. O. Larlus, S. Mintova, V. Valtchev, B. Jean, T. H. Metzger, T. Bein, Silicalite-1/polymer films with low-k dielectric constants, Applied Surface Science, 226 (1-3), 2004, pp. 155-160
17. Miki Egami, Semiconductor Device Porous Silica Thin Film Characteristics, Science and Industry, 77 (11), 2003, pp. 582-587

In prior art references 1, 3 and 13 above, Wang et al. disclose the results of in-situ growth of an MFI-type zeolite crystal film in a heat application atmosphere on a silicon substrate through immersion of the substrate in an autoclave coated with polytetrafluoroethylene in which starting chemicals of tetraethyl orthosilicate (TEOS), tetrapropyl ammonium hydroxide (TPAOH) and water have been introduced and well mixed. The film thus obtained is found to be excellent in mechanical strength (Young's modulus of 30 to 40 GPa) and have low relative permittivity of 2.7 to 3.3. While adaptability of the in-situ zeolite crystallization technique for the semiconductor fabrication technique leaves serious problems, the high potential of zeolite polycrystal thin films has been demonstrated in its principle.

Also in prior art references 1, 2, 3 and 14, Wang et al. disclose the results of the film formation by spin-coating using a conventional method on the synthesis of an MFI-type zeolite nanocrystal suspension by hydrothermal crystallization, in which after the synthesis a short-time low-speed centrifugation is used to remove crystals of large grain size, and the remaining suspension is applied onto the substrate by spin-coating. The film thus obtained has a bi-modal porous structure comprising micropores of 0.56 nm peculiar to MFI-type zeolites and interparticle mesopores of 2 to 17 nm. The mesopores are regulated to control the relative permittivity to a range of 1.8 to 2.1. Furthermore, y-cyclodextrin is used as a porogen (pore generator) to increase the mesopore volume fraction and succeed in materialization of an MFI-type pure-silica zeolite-based film having relative permittivity of 1.6 to 1.7. As the increased mesopores, it cannot be avoided to increase the hygroscopicity and lower the mechanical strength. Though Wang et al. have succeeded in obtaining a pure-silica film of low relative permittivity through the spin-coating of a liquid containing nanocrystal grains on a silicon substrate, no report is made of any experimental results proving the flatness of the film surface. They rather report that it is necessary to polish the surface of the film obtained through spin-coating using a liquid containing alumina particles for ten minutes or subject the film to secondary growth to acquire surface flatness. A check experiment was actually conducted in accordance with this report, the surface of the film obtained was in a terrible state, i.e. too coarse to obtain useful data through thin film measurement by spectroscopic ellipsometry.

Also, Wang et al. describe in prior art references 4 and 5 that improvement in surface flatness and pore diameter distribution could take place when mixing an organic substance or polymer into a liquid. However, no demonstrative data thereof is shown. While the internal pore surface of pure-silica zeolites is hydrophobic, the external surface of zeolite crystal grains and amorphous silica surrounding the grains have a silanol (—OH) group and consequently exhibit hydrophilicity. Taking this into consideration, Wong et al. have mixed methyl-group into a solution for application in a large amount of 50% by weight, thereby having succeeded in making the entire film hydrophobic.

According to the method of Gayner et al., as described in prior art references 6 to 9, a porous material of low relative permittivity that comprises two components, i.e. MFI-type zeolite crystals and a porous binder is obtained. The film obtained has relative permittivity of 2.15 to 2.45 and Young's modulus of 5 GPa or less. The porous binder is synthesized through addition of a small amount of acidic water to an ethyl alcohol solution of TEOS with hydrolyzed amorphous silica containing pores of 5% or less. However, they do not show any data on the surface flatness and pore diameter distribution of the film thus obtained.

In the method of Larlus et al., a porous irregular structure composite of MFI-type zeolite and acryl rubber polymer is used to materialize a film having relative permittivity of 2.0 to 2.56. Though they admit the film surface flatness, neither the mechanical strength of the film nor the pore diameter distribution thereof is touched upon.

Egami et al. reports a film of low relative permittivity having relative permittivity of 2.3 and Young's modulus of 8 to 10 GPa as described in prior art references 10, 11 and 17. The production method is directed to spin-coating of liquid containing MFI-type zeolite crystals. Followed by the spin-coating is the heat treatment at 400° C., and it is reported that in the subsequent Fourier transform infrared spectroscopy, the peak that ought to appear in the spectrum resulting from the MFI-type zeolite structure has disappeared. They also disclose a method for the production of a low-relative-permittivity thin film of hydrophobic amorphous silica (having relative permittivity of 2.5 or less and Young's modulus of 6 GPa or more). The method adopts TEOS as a silica source, TPAOH or tetrabutylammonium hydroxide (TBAOH) as a template molecule, methyl trimethoxysilane (MTMS) or methyl triethoxysilane (MTES) as a methyl source for promoting film hydrophobicity and ethyl alcohol as a solvent, and the reaction temperature and reaction time are as low as 50° C. and as short as 20 hours, respectively. A check experiment conducted under the same reaction conditions failed to detect zeolite crystals in the liquid. The film obtained is found to be a porous silica film though the synthesizing method is similar to the case of zeolite.

Takamura et al. disclose in prior art reference 12 that the mechanical strength of a low-relative-permittivity film of MFI-type zeolite is enhanced through the treatment with tetramethylcyclotetrasiloxane (TMCTS). However, the method of the production of an MFI-type zeolite described therein is the same as that of Wang et al, and the relative permittivity reported is 3.2 that is a rather high value.

In the prior art references, as described above, pure-silica films of low relative permittivity are obtained through spin-coating of the suspensions containing particles of various sizes. However, the thin films are formed each of MFI-type zeolite, and no data on thin film surface flatness is shown, meaning that the surface flatness would be insufficient. The hydrophobicity of the films cannot be said to be satisfactory. Furthermore, the synthesizing method in each of the prior art references is used to give rise to large particles and requires centrifugation prior to the spin-coating of a suspension containing MFI-type zeolite crystals, resulting in a cumbersome and costly production process.

The present invention has been proposed in view of the above drawbacks and has as its object provision of a zeolite suspension, a zeolite nano-crystal production method, a zeolite suspension production method and a zeolite thin film, in which it is possible to secure sufficient strength of a zeolite film even when the principal component comprises zeolite nano-crystals other than MFI-type zeolite crystals, materialize reduction in the relative permittivity thereof, enhancement of the surface flatness thereof and enhancement of the hydrophobicity thereof and simplify the production process thereof to render the cost thereof inexpensive.

SUMMARY OF THE INVENTION

To attain the above object, the present invention provides as a first aspect a zeolite suspension containing MEL-type zeolite nanocrystals as a principal component.

The present invention also provides as a second aspect a method for the production of MEL-type zeolite nanocrystals, comprising the steps of aging a synthesized solution comprising TEOS, TBAOH, water and alcohol and subjecting the aged solution to hydrothermal crystallization treatment at a predetermined temperature.

The present invention further provides as a third aspect a method for the production of a zeolite suspension, comprising the steps of aging a synthesized solution comprising TEOS, TBAOH, water and alcohol, subjecting the aged solution to hydrothermal crystallization treatment at a predetermined temperature to produce MEL-type zeolite nanocrystals and mixing at least one organic solvent or a mixed organic solvent of alcohol-based organic solvents, amide-based organic solvents and ketone-based organic solvents with a zeolite nano-crystal suspension containing the MEL-type zeolite nanocrystals to produce a zeolite suspension.

The present invention further provides as a fourth aspect a method for the production of a zeolite suspension, comprising the steps of aging a synthesized solution comprising TEOS, TBAOH, water and alcohol, subjecting the aged solution to hydrothermal crystallization treatment to produce MEL-type zeolite nanocrystals and mixing a composition having a surfactant dissolved in at least one organic solvent or a mixed solvent of alcohol-based organic solvents, amide-based organic solvents and ketone-based organic solvents with a zeolite nano-crystal suspension containing the MEL-type zeolite nanocrystals to produce a zeolite suspension.

The present invention further provides as a fifth aspect a method for the production of a zeolite suspension, comprising the steps of aging a synthesized solution comprising TEOS, TBAOH, water and alcohol, subjecting the aged solution to hydrothermal crystallization treatment to produce MEL-type zeolite nanocrystals, mixing a composition having a surfactant dissolved in at least one organic solvent or a mixed solvent of alcohol-based organic solvents, amide-based organic solvents and ketone-based organic solvents with a zeolite nano-crystal suspension containing the MEL-type zeolite nanocrystals to obtain a mixed suspension and allowing a methyl group to exist in the mixed solution to produce a zeolite suspension.

The invention provides as a sixth aspect the method for the production of a zeolite suspension according to the fourth or fifth aspect, wherein the surfactant has a ratio of 0.1 to 1.5% by weight based on at least one organic solvent or mixed solvent.

The invention provides as a seventh aspect the method for the production of a zeolite suspension according to the fourth or fifth aspect, wherein the composition has a concentration of 5 to 50% based on the zeolite nano-crystal suspension.

The invention provides as a eighth aspect the method for the production of a zeolite suspension according to the fifth aspect, wherein the methyl group has a volume fraction of 1 to 10% of the zeolite nano-crystal suspension.

The invention provides as a ninth aspect the method for the production of a zeolite suspension according to the fourth or fifth aspect, wherein the surfactant comprises (a) an amphipathic tri-block copolymer that is polyethylene oxide-polypropylene oxide-polyethylene oxide including L series of L31, L35, L43, L44, L61, L62, L62D, L62LF, L64, L81, L92, L10, L101 and L121, P series of P65, P84, P85, P103, P104, P105 and P123, F series of F38, F68, F68LF, F77, F87, F88, F98, F108 and F127 or R series of 10R5, 17R2, 17R4, 25R2, 25R4 and 31R1 or (b) a di-block copolymer that is $C_nH_{2n+1}(OCH_2CH_2)_xOH$, wherein n is an integer of 12 to 18 and x is an integer of 2 to 100, or a mixture of (a) and (b).

The invention provides as a tenth aspect the method for the production of a zeolite suspension according to any one of the third to tenth aspects, wherein the surfactant comprises (c) alkyltrimethyl ammonium bromide including $C_{16}H_{33}N(CH_3)_3Br$(HTMABr) or alkyltriethyl ammonium bromide including $C_{16}H_{33}N(C_2H_5)_3Br$(HTEABr) or (d) alkyltrimethyl ammonium chloride including $C_{12}H_{25}N(CH_3)_3Cl$($C_{12}$TAC), $C_{14}H_{29}N(CH_3)_3Cl$($C_{14}$TAC) and $C_{18}H_{37}N(CH_3)_3Cl$($C_{18}$TAC) or a mixture of (c) and (d).

The invention provides as an eleventh aspect the method for the production of a zeolite suspension according to any one of the third to tenth aspects, wherein the alcohol-based organic solvents include 1-propanol, 2-propanol, 1-butanol and 2-butanol, the amide-based organic solvents include N,N-dimethylformamide, N,N'-dimethylacetamide and N-methylpyrrolidinone, and the ketone-based organic solvents include acetone and methyl ethyl ketone.

The invention provides as a twelfth aspect the method for the production of a zeolite suspension according to the fifth aspect, wherein the methyl group comprises at least one member selected from the group consisting of methyltriethoxysilane, dimethyldiethoxysilane and trimethylethoxysilane.

The present invention further provides as a thirteenth aspect a zeolite thin film produced through spin-coating of the zeolite suspension produced by the method according to any one of the third to twelfth aspects onto a substrate The present invention further provides as a fourteenth aspect a zeolite thin film produced through spin-coating of the zeolite suspension produced by the method according to any one of the third to twelfth aspects onto a substrate to have relative permittivity of 1.8 to 2.0.

In the present invention, a synthesized solution comprising TEOS, TBAOH, water and alcohol is aged and then subjected to hydrothermal crystallization treatment at a predetermined temperature to produce MEL-type zeolite nanocrystals. An organic solvent is then mixed with a zeolite nano-crystal suspension containing the MEL-type zeolite nanocrystals to produce a zeolite suspension. Thus, in the case of a zeolite thin film having MEL-type zeolite nanocrystals as the principal component, the film acquires sufficiently high strength and high-level Young's modulus of about 10 to 12 GPa. The relative permittivity of the film can be reduced to 1.8 to 2.0, and the surface thereof is very flat. The film has a low refractive index of around 1.12 and thus can be used as an extremely low refractive-index film excellent in mechanical strength.

A surfactant is further mixed with the solvent to produce a zeolite suspension to enable the refractive index and relative permittivity to be further reduced and the mesopore size distribution to be narrowed.

A methyl group is allowed to exist in the zeolite suspension to enable the hydrophobicity to be enhanced to a great extent.

The zeolite suspension contains highly uniform MEL-type zeolite nanocrystals as the principal component. Therefore, it is not necessary to subject the zeolite suspension obtained to centrifugation operation and the liquid can be transferred to a film formation step without being modified. Thus, the film formation step can be simplified to enable the reduction of cost.

The above and other objects, characteristic features and advantages of the present invention will become apparent to those skilled in the art from the description made herein below with reference to the accompanying drawings.

DETAILED DESCRIPTION OF THE PREFERRED EMBODIMENTS

The embodiments of the present invention will be described hereinafter in detail with reference to the accompanying drawings.

Figure 1:
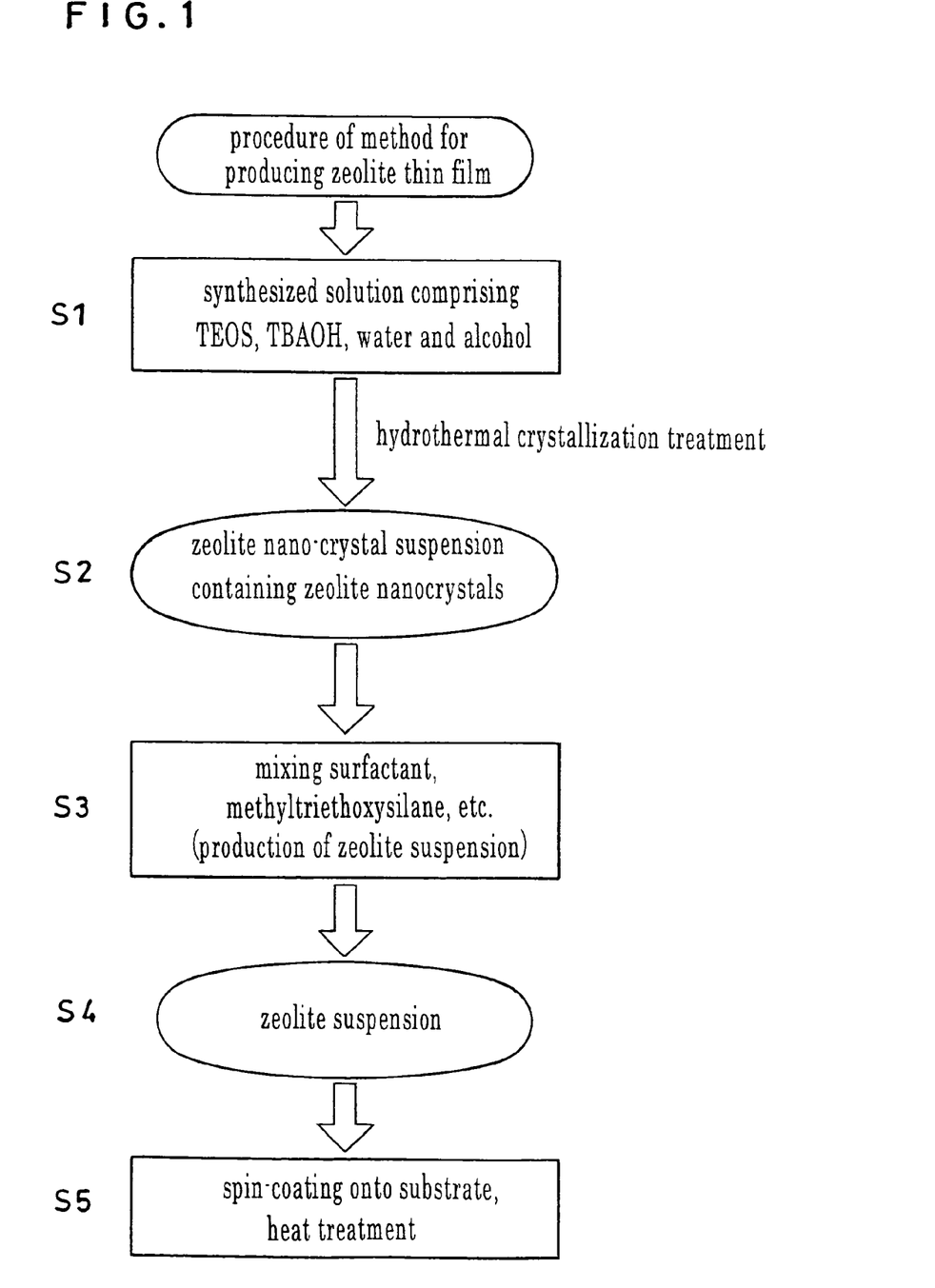
FIG. 1 a schematic diagram showing the procedure for producing a zeolite thin film according to the present invention.

FIG. 1 schematically shows the procedure of a method for the production of a zeolite thin film according to the present invention. A zeolite suspension for producing a zeolite thin film (nanoporous thin film of low-relative permittivity) comprises three compositions, (i) a zeolite nano-crystal suspension containing MEL-type pure-silica zeolite nano-crystal grains (zeolite nanocrystals) that has undergone thermal crystallization treatment, (ii) a surfactant for controlling surface flatness and mesopore structure and (iii) an additive for enhancing the hydrophobicity.

The composition (i) is produced at steps S1 and S2 in FIG. 1. The method of synthesizing the composition (i) that is a zeolite nano-crystal suspension containing MEL-type zeolite nanocrystals will be described. The molar composition ratio of the starting chemicals to be synthesized is set to 1.0TEOS:3.6TBAOH:12H$_2$O:x-alcohol, wherein TEOS denotes tetraethyl orthosilicate and TBAOH tetrabutylammonium hydroxide. As alcohol, methanol, ethanol, propanol, butanol or mixed alcohol of two or more of them can be cited. Though the value of the molar concentration ratio "x" is 0 to 5, preferably 0.5 to 1, most preferably 0.85. The reaction temperature is 90 to 120° C., preferably 95 to 115° C., most preferably 100° C.

A transparent liquid having the aforementioned mixing ratio is retained in a capped bottle of PFA (polytetrafluoroethylene) at room temperature (23° C.) for 10 to 30 hours, most preferably 20 hours while being well stirred with a stirrer provided in the bottle. The bottle containing the liquid is then placed in a heater oven, and the liquid undergoes hydrothermal crystallization treatment while being stirred. When the reaction temperature is 90 to 120° C., preferably 95 to 115° C., most preferably 100° C., nanosized MEL-type zeolite nano-crystal grains (zeolite nanocrystals) can be obtained.

The synthesizing time depends on the reaction conditions. In the case of a one-stage reaction process that is a process in which crystallization is completed through a single reaction process, the reaction time is 40 to 150 hours, most preferably 120 hours. In the case of two-stage reaction process, the first-stage reaction time is 48 to 72 hours, most preferably 60 hours, and the second-stage reaction time is 10 to 20 hours, most preferably 12 hours.

MFI-type pure-silica zeolite nano-crystals synthesized are required to perform centrifugation for the purpose of removing large crystal grains, whereas since MEL-type pure-silica zeolite nano-crystals synthesized have their crystal grain sizes aligned substantially, such a centrifugation operation is not required.

The composition (ii) is then prepared. The composition (ii) is used as having 0.1 to 1.5% by weight of a surfactant dissolved in an organic solvent. The organic solvent used herein refers to any one or a mixture of (1) alcohol-based organic solvents (such as 1-propanol, 2-propanol, 1-butanol and 2-butanol), (2) amide-based organic solvents (such as N,N'-dimethylformamide (DMF) N,N'-dimethylacetamide (DMA) and N-methylpyrrolidinone (NMP)) and (3) ketone-based organic solvents (such as acetone and methyl ethyl ketone).

The surfactant comprises (a) an amphipathic tri-block copolymer that is polyethylene oxide-polypropylene oxide-polyethylene oxide, such as L series of L31, L35, L43, L44, L61, L62, L62D, L62LF, L64, L81, L92, L10, L101 and L121, P series of P65, P84, P85, P103, P104, P105 and P123, F series of F38, F68, F68LF, F77, F87, F88, F98, F108 and F127 or R series of 10R5, 17R2, 17R4, 25R2, 25R4 and 31R1, or (b) a di-block copolymer that is $C_nH_{2n+1}(OCH_2CH_2)_xOH$, wherein n is an integer of 12 to 18 and x is an integer of 2 to 100, or a mixture of (a) and (b), or (c) alkyltrimethyl ammonium bromide including, such as $C_{16}H_{33}N(CH_3)_3Br$(HTMABr) or alkyltriethyl ammonium bromide, such as $C_{16}H_{33}N(C_2H_5)_3Br$(HTEABr), or (d) alkyltrimethyl ammonium chloride, such as $C_{12}H_{25}N(CH_3)_3Cl$ ($C_{12}$TAC), $C_{14}H_{29}N(CH_3)_3Cl$($C_{14}$TAC) and $C_{18}H_{37}N(CH_3)_3$ Cl($C_{18}$TAC), or a mixture of (c) and (d).

The composition (iii) is then prepared. The composition (iii) is a methyl group, such as methyltriethoxysilane, dimethyldiethoxysilane and trimethylethoxysilane.

Returning to FIG. 1, the composition (ii) is thoroughly mixed at step S3 with the zeolite nanocrystal-containing zeolite nano-crystal suspension (composition i) obtained at step S1 to obtain a mixture, and the composition (iii) is mixed in the mixture to produce a zeolite suspension (step S4). The concentration of the composition (ii) to the composition (i) is regulated to a range of 5 to 50%, preferably 20%. The volume fraction of the composition (iii) to the composition (i) is in the range of 1 to 10%, preferably 5%. It is conceivable that the composition (ii) contributes to enhancement of the surface flatness, reduction of the refractive index, reduction of the relative permittivity and uniformization of the mesopore size. The composition (iii) is for enhancing the hydrophobicity.

At subsequent step S5, the substrate is subjected to spin-coating. Specifically, the zeolite suspension obtained through mixing of the compositions (i), (ii) and (iii), is spin-coated on a silicon wafer 200 mm in diameter. The spin coating rate of the substrate is 1500 to 2500 rpm, preferably 1500 to 2500 rpm, most preferably 2000 rpm. The spin-coating duration is 5 to 80 sec, preferably 10 to 40 sec, most preferably 20 sec. The film obtained is very excellent in flatness and is found to have no striation.

The film obtained through the spin-coating is subjected to heat treatment at 90° C. for 2 hours and then to atmospheric calcination treatment at 400° C. for 2 to 8 hours (most suitably 5 hours). The atmospheric calcination treatment can deprive the organic component of the film. The temperature elevation rate thereof is 1° C./min.

The zeolite thin film produced through the aforementioned procedure is evaluated as follows. Spectroscopic ellipsometer made under product code of GES-5 by Sopra SA, France is used to determine the refractive index and thickness of the film. A scanning electron microscope made under product code of S4700 by Hitachi Ltd., Japan is used to examine the surface features of the film obtained. The presence of an MEL-type zeolite structure is confirmed through measurement by an Excalibur-type Fourier transform infrared spectrometer made by Digilab besides measurement by the X-ray diffraction. Measurements of Young's modulus are performed using a Nano indenter XP made by MST Corp., U.S.A. The mesopore size distribution is obtained by adsorption spectroscopic ellipsometry. A 4284-type precise LCR meter made by Agilent Technologies, Inc., U.S.A. is used to measure the relative permittivity.

In the foregoing description, a zeolite suspension is produced in the presence of a methyl group in order to enhance the hydrophobicity. Alternatively, the zeolite thin film obtained through the spin-coating may be subjected to annealing treatment in a TMCTS (tetramethylcyclotetrasiloxane) gas (TMCTS treatment) in the absence of a methyl group. The optimum temperature of the TMCTS treatment for the zeolite thin film is 400° C., and the optimum treatment time is 25 to 35 minutes. To further enhance the hydrophobicity, a methyl group may be allowed to exist, and the TMCTS treatment may be performed.

Also in the foregoing description, a zeolite suspension is produced through the addition of both a surfactant (composition (ii)) and a methyl group. Otherwise, only the surfactant is mixed, in the absence of the methyl group, or only an organic solvent is mixed, without addition of the surfactant and methyl group, with a zeolite nano-crystal suspension to produce a zeolite suspension. In any of these cases, it is possible to produce a zeolite thin film containing MEL-type zeolite nanocrystals as the principal component and to acquire sufficient strength, low relative permittivity, low refractive index and high surface flatness.

Now, examples of the present invention will be described in detail, but the present invention is not limited to these examples.

EXAMPLE 1

To a 40% TBAOH solution under agitation, 15 ml of TEOS was added dropwise. Upon completion of the dropwise addition, 15 ml of ethanol was added to the resultant solution to obtain a mixed solution. The mixed solution was introduced into a cleaned bottle of PFA that was then covered with a cap and retained at room temperature of 23° C. for 20 hours. Subsequently, the PFA bottle containing the mixed solution was placed in an electrical oven, and the mixed solution was subjected to hydrothermal crystallization for 12 hours while being stirred, thereby obtaining a transparent colloidal suspension. The colloidal suspension was then cooled gradually to room temperature of 23° C. to obtain a colloidal suspension (zeolite nano-crystal suspension) of MEL-type pure-silica zeolite (zeolite nanocrystals). The colloidal suspension thus obtained contained no large crystals that had to be removed through centrifugation as was required in the synthesis of an MFI-type pure-silica zeolite suspension.

The surface flatness of the film obtained was examined through the shape observation by an optical microscope equipped with a digital camera, the measurement of the film thickness and refractive index by a spectroscopic ellipsometer and the observation by a scanning electron microscope. As a result, no striation was found, the film thickness and refractive index was uniform over the entire surface of the film, and the refractive index is as low as 1.12.

Figure 2:
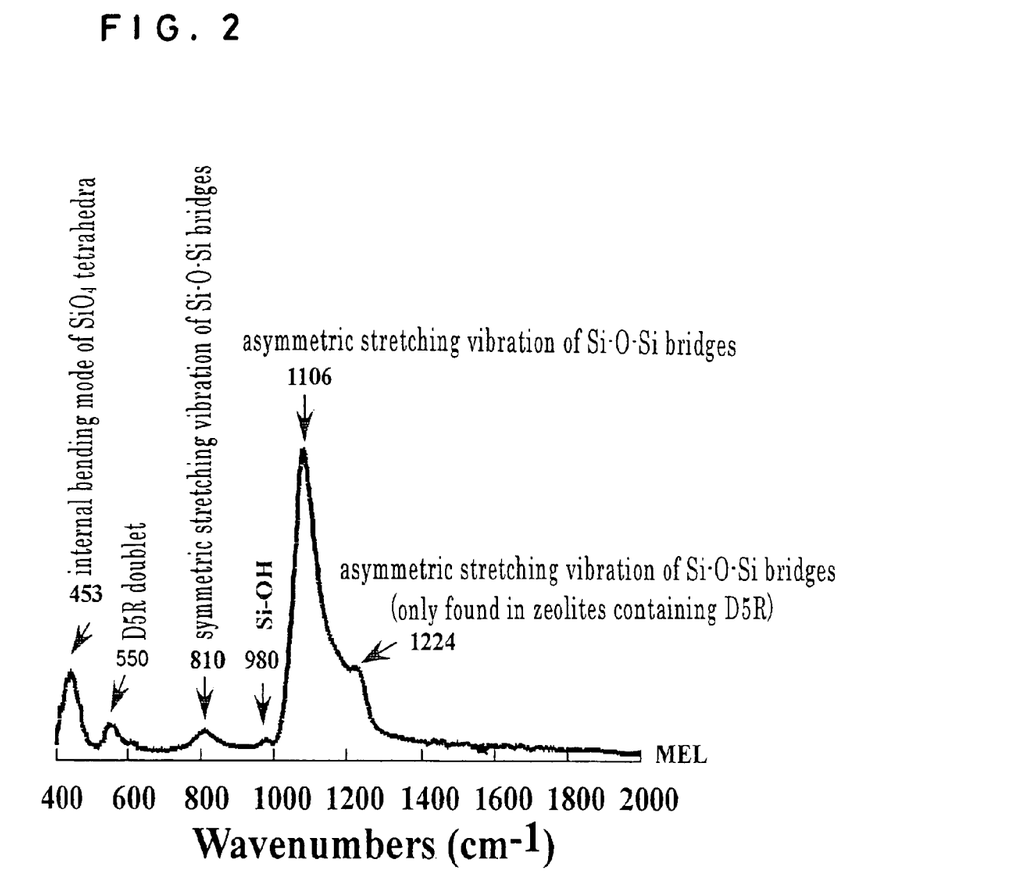
FIG. 2 is a diagram showing the Fourier transform infrared absorption spectrum of a zeolite thin film in Example 1.

FIG. 2 is diagram showing the Fourier transform infrared absorption spectrum of the zeolite thin film in Example 1. It is found from FIG. 2 that absorptions occurred at 1224 cm$^{-1}$ and 1106 cm$^{-1}$ (asymmetric stretching vibration of Si—O—Si bridges), 810 cm$^{-1}$ (symmetric stretching vibration of Si—O—S bridges), 550 cm$^{-1}$ (double, five-membered ring mode in the zeolite framework) and 453 cm$^{-1}$ (internal bending mode of SiO$_4$ tetrahedra). The absorption band around 1224 cm$^{-1}$ was only found in the zeolites containing five-numbered rings. The absorption band around 550 cm$^{-1}$ was assigned to the asymmetric stretching vibration in the five-membered ring mode. Splitting of this lattice-sensitive absorption band into a doublet is a conclusive evidence of the presence of the MEL-type zeolite framework. Thus, since the peak showing the presence of the MEL-type zeolite was observed, the zeolite thin film was of an MEL type. The Young's modulus of the film obtained was found to be 6.5 GPa in consequence of the measurement of the nano-indentation. The relative permittivity thereof was found to be 2.05 at 100 kHz through the capacitance measurement.

For the purpose of enhancing the hydrophobicity and improve the mechanical strength, the film was subjected to TMCTS treatment for 15 min, 25 min, 35 min and 45 min, respectively. The results thereof were compared as shown in FIG. 3.

Figure 3:
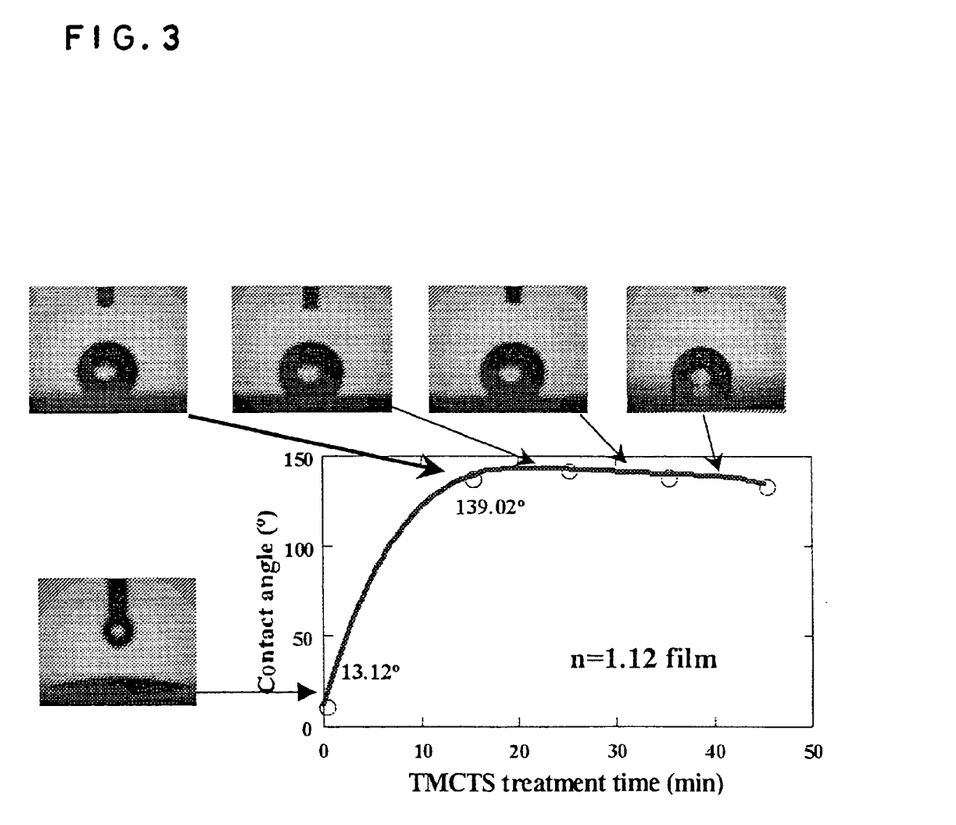
FIG. 3 is a diagram showing the relation between TMCTS treatment time and water contact angle in the zeolite thin film in Example 1.

FIG. 3 shows the relation between the TMCTS treatment time and the water contact angle in the zeolite thin film in Example 1, in which the lateral axis stands for the TMCTS treatment time and the vertical axis for the water contact angle. It is understood from FIG. 3 in which the water contact angle is increased from 13° before the treatment to 139° after the treatment that the hydrophobicity is enhanced. The four upper side and one lower left side photographs in FIG. 3 show the states of the water given dropwise to the thin film, in each of which what is circular is a water drop.

Figure 4:
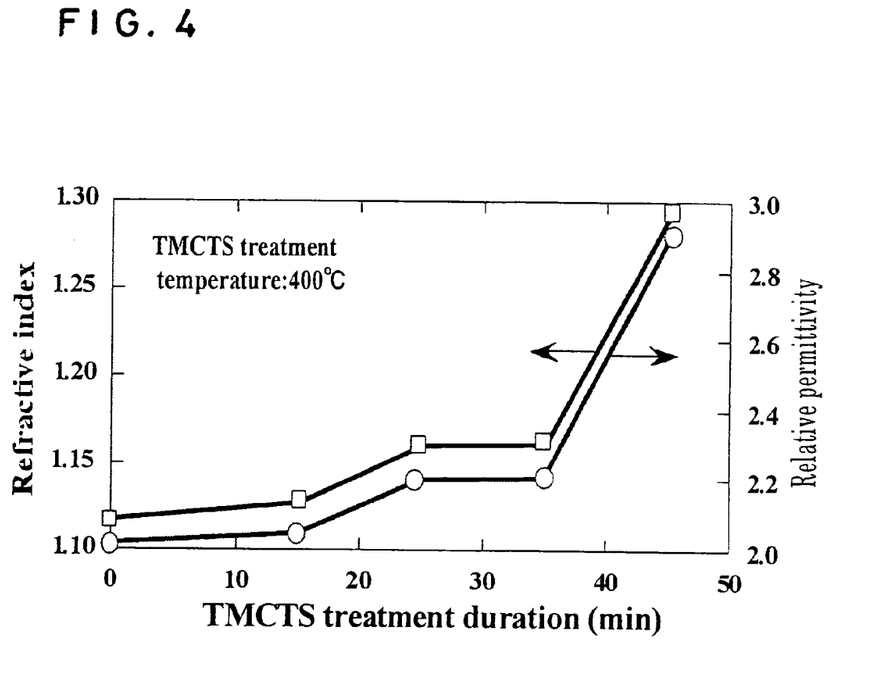
FIG. 4 is a diagram showing the effect of TMCTS treatment time on the refractive index and relative permittivity of the zeolite thin film in Example 1.

FIG. 4 shows the variation in the refractive index and relative permittivity of the zeolite thin film that has undergone TMCTS treatment in Example 1, in which the lateral axis stands for the TMCTS treatment duration, the left vertical axis for the refractive index and the right vertical axis for the relative permittivity, respectively. It was found from the experimental results that the optimum conditions for the TMCTS treatment were 400° C. and 15 to 35 minutes and that the Young's modulus of the film that underwent the TMCTS treatment at 400° C. for 35 minutes was increased to 9.6 GPa.

EXAMPLE 2

In 99 ml of a 1-butanol solution 1 g of tri-block copolymer P123 was dissolved to obtain a composition (ii). A composition (i) synthesized under the same conditions as in Example 1 was thoroughly mixed with the composition (ii) in Example 2 to obtain a liquid. Low-resistivity and high-resistivity silicon wafers 200 mm in diameter were spin-coated with 3 ml of the liquid. The wafer rotation rate during the spin-coating was 2000 rpm, and the spin-coating time was 10 sec. The film obtained was heat-treated in the atmosphere at 90° C. for 2 hours and then calcined at 400° C. for 5 hours. The heating rate at the calcination was 1° C./min. The film obtained was analyzed and evaluated for the refractive index that was 1.07 and the relative permittivity that was 1.81. The results show the improvements in comparison with the results in Example 1 (the refractive index of 1.12 and relative permittivity of 2.05) in which no composition (ii) was added.

Figure 5:
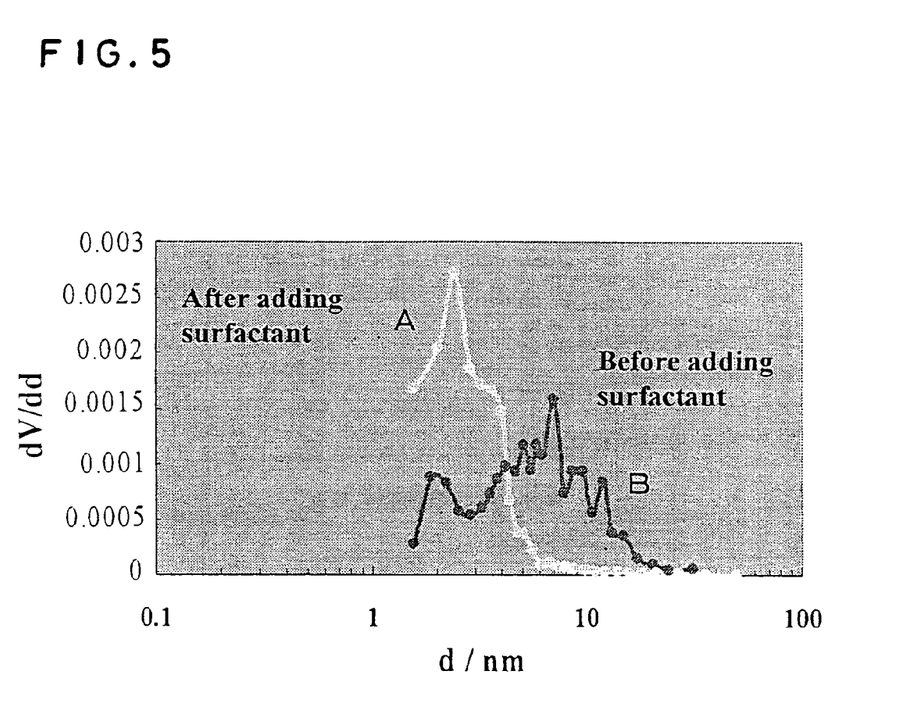
FIG. 5 is a diagram showing the effect of the addition of a surfactant on the pore size distribution of the zeolite thin film in Example 2.

FIG. 5 shows the effect of the addition of a surfactant on the pore size distribution of the zeolite thin film in Example 2, in which the lateral axis stands for the mesopore size (nm), the vertical axis for the amount of heptane adsorbed, A for the case after adding a surfactant (composition (ii)) and B for the case before adding a surfactant. As shown in FIG. 5, the addition of the composition (ii) made the pore size distribution narrower.

EXAMPLE 3

In 99 ml of 1-butanol 1 g of tri-block copolymer L44 was dissolved to produce a composition (ii). A composition (i) synthesized in accordance with the same method as in Example 1 was thoroughly mixed in an amount of 8 ml with 2 ml of the composition (ii) in Example 3 to obtain a liquid. Low-resistivity and high-resistivity silicon wafers 200 mm in diameter were spin-coated with 3 ml of the liquid. The wafer rotation rate during the spin-coating was 2000 rpm and the spin-coating duration was 10 sec. The film obtained was heat-treated in the atmosphere at 90° C. for 2 hours and then calcined at 400° C. for 5 hours. The heating rate at the calcination was 1° C./min. The film obtained was analyzed and evaluated for the refractive index that was 1.10 and the relative permittivity that was 1.92. The results show the improvements in comparison with the results in Example 1 (the refractive index of 1.12 and relative permittivity of 2.05) in which no composition (ii) was added.

As a result of the measurement of the mesopore size distribution, no mesopore having a diameter exceeding 2 nm was detected. On the other hand, in Example 2, mesopores having a uniform diameter of approximately 2 nm were obtained. The molecular weight of P123 used as the composition (ii) in Example 2 is about two times higher than that of L44 used in Example 3. This suggests controllability of the mesopore size depending on adoption of a surfactant having a different molecular weight.

EXAMPLE 4

In 10 ml of ethanol 20 ml of dimethyldiethoxysilane was dissolved, and the resultant solution was retained at 50° C. for 20 hours to produce a composition (iii). A composition (i) in the amount of 8 ml synthesized in accordance with the same method as in Example 1, a composition (ii) in the amount of 2 ml prepared in accordance with the same method as in Example 2 and 1 ml of the composition (iii) in Example 4 were thoroughly mixed to obtain a liquid. Low-resistivity and high-resistivity silicon wafers 200 mm in diameter were spin-coated with 3 ml of the liquid. The wafer rotation rate during the spin-coating was 2000 rpm and the spin-coating duration was 10 sec. The film obtained was heat-treated in the atmosphere at 100° C. for 2 hours and then calcined at 400° C. for 5 hours. The heating rate at the calcination was 1° C./min. The film obtained was analyzed and evaluated for the refractive index that was 1.14 and the relative permittivity that was 2.06.

Figure 6:
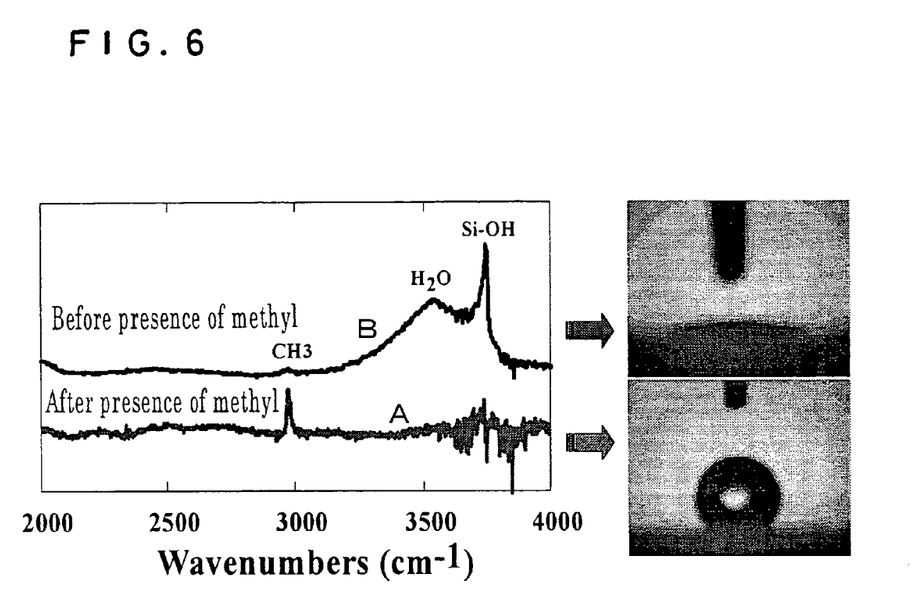
FIG. 6 is a diagram showing the effect of the presence of a methyl group on the infrared absorption spectrum and enhancement of hydrophobicity of the zoelite thin film in Example 4.

FIG. 6 shows the variation in the infrared absorption spectrum and the effect of enhancing the hydrophobicity in the presence of a methyl group in the zeolite thin film in Example 4, in which the lateral axis stands for wavenumbers, the vertical axis for a spectrum, A for the case after the presence of a methyl group and B for the case before the presence of an ethyl group. As shown in FIG. 6, the presence of a methyl group (composition (iii)) decreases the Si—OH peak sharply and, as will be understood from the right-side photographs, in the case A, the contact angle of water (what is circle in the right lower photograph) becomes large, indicating that the hydrophobicity of the film is enhanced.

Comparative Example

While stirring 12.5 ml of an aqueous 25% TPAOH solution, 10 ml of TEOS was added dropwise to the solution. Upon completion of the dropwise addition, 10 ml of ethanol was added to the resultant mixture to obtain a liquid. The liquid is retained at room temperature of 23° C. for 72 hours. The retained liquid was introduced into a capped PFA bottle, and the liquid was further retained at 85° C. for 66 hours while being stirred. A milky colloidal suspension of MFI-type pure-silica zeolite obtained is cooled gradually to room temperature.

The thus obtained liquid in the amount of 10 ml was centrifuged at 5000 rpm for 15 min. A supernatant of the resultant liquid was thoroughly mixed with 2.5 ml of dimethyl formaldehyde. Low-resistivity and high-resistivity silicon wafers 200 mm in diameter were spin-coated with 3 ml of the resultant liquid. The wafer rotation rate during the spin-coating was 200 rpm and the spin-coating time was 10 sec. The film obtained was heat-treated in the atmosphere at 90° C. for 2 hours and then calcined at 400° C. for 5 hours. The heating rate at the calcination was 1° C./min. The Young's modulus of the film obtained was 8 to 10 GPa in consequence of the nano-indentation measurement. The relative permittivity measured by the capacitance measurement was 2.2 to 2.7. The mesopore size distribution was 2 to 11 nm.

The measurement results in Examples 1 to 4 and Comparative Example are shown in Table 1 below.

TABLE 1

|  | Film thickness (nm) | Refractive index. | Relative permittivity | Surface state | Mesopore distribution (nm) | Young's modulus (GPa) | Young's modulus (GPa) after TMCTS treatment |
|---|---|---|---|---|---|---|---|
| Ex. 1 | 305 | 1.12 | 2.05 | Flat | 2-12 | 6.5 | 9.6 |
| Ex. 2 | 477 | 1.07 | 1.81 | Flat | <2 | . . . | . . . |
| Ex. 3 | 349 | 1.10 | 1.92 | Flat | <1 | . . . | . . . |
| Ex. 4 | 291 | 1.14 | 2.06 | Flat | <2 | . . . | . . . |
| Comp. Ex. | 294 | 1.24 | 2.6 | Flat | 2-11 | . . . | 9.5 |

It is confirmed from the thin film evaluation results in Examples 1 to 4 and from FIG. 2 that the thin films have an MEL-type zeolite structure.

In the present invention, a synthesized solution comprising TEOS, TBAOH, water and alcohol was aged and then subjected to hydrothermal crystallization to produce MEL-type zeolite nanocrystals, and an organic solvent was added to a zeolite nano-crystal suspension containing the MEL-type zeolite nanocrystals to produce a zeolite suspension. Therefore, even in the case where the principal component was MEL-type zeolite nanocrystals, the zeolite thin film has secured its sufficient strength and exhibited its Young's modulus of a high level of about 10 GPa. Also, the relative permittivity could be reduced to 1.8 to 2.0, and a high surface flatness could be obtained. The refractive index of the film could be as low as approximately 1.1. Thus, the film can be used as an extremely low refractive-index film excellent in mechanical strength for optical parts.

Furthermore, since addition of a surfactant was adopted to produce a zeolite suspension, it was made possible to further reduce the refractive index and relative permittivity, narrow the mesopore size distribution and enhance the surface flatness. Also, since a methyl group was allowed to exist in the zeolite suspension, it was made possible to enhance the hydrophobicity to a great extent.

As has been described in the foregoing, according to the present invention, since the zeolite suspension contains MEL-type zeolite nanocrystal grains as the principal component, the zeolite suspension obtained is unnecessary to centrifuge and can be transferred in situ to a step of forming a thin film on a substrate. Therefore, cost reduction can be attained based on the simplified film formation processing.

What is claimed is:

1. A method for the production of MEL-type zeolite nanocrystals, comprising:
   aging a synthesized solution comprising TEOS, TBAOH, water and alcohol; and
   subjecting the aged solution to hydrothermal crystallization treatment.

2. A method for the production of a zeolite suspension, comprising:
   aging a synthesized solution comprising TEOS, TBAOH, water and alcohol;
   subjecting the aged solution to hydrothermal crystallization treatment to produce MEL-type zeolite nanocrystals; and
   mixing at least one organic solvent or a mixed organic solvent of alcohol-based organic solvents, amide-based organic solvents and ketone-based organic solvents with a zeolite nano-crystal suspension comprising the MEL-type zeolite nanocrystals to produce a zeolite suspension.

3. The method for the production of a zeolite suspension according to claim 2, wherein
   the alcohol-based organic solvents are selected from the group consisting of 1-propanol, 2-propanol, 1-butanol and 2-butanol;
   the amide-based organic solvents are selected from the group consisting of N,N-dimethylformamide, N,N'-dimethylacetamide and N-methylpyrrolidinone; and
   the ketone-based organic solvents are selected from the group consisting of acetone and methyl ethyl ketone.

4. A zeolite thin film produced by spin-coating of the zeolite suspension, produced by the method according to claim 2, onto a substrate.

5. The zeolite thin film according to claim 4, wherein the film has a relative permittivity of 1.8 to 2.0.

6. A method for the production of a zeolite suspension, comprising:
   aging a synthesized solution comprising TEOS, TBAOH, water and alcohol;
   subjecting the aged solution to hydrothermal crystallization treatment to produce MEL-type zeolite nanocrystals; and
   mixing a composition comprising a surfactant dissolved in at least one organic solvent or a mixed solvent of alcohol-based organic solvents, amide-based organic solvents and ketone-based organic solvents with a zeolite nano-crystal suspension comprising the MEL-type zeolite nanocrystals to produce a zeolite suspension.

7. The method for the production of a zeolite suspension according to claim 6, wherein the surfactant has a ratio of 0.1 to 1.5% by weight based on at least one organic solvent or mixed solvent.

8. The method for the production of a zeolite suspension according to claim 6, wherein the composition has a concentration of 5 to 50% based on the zeolite nano-crystal suspension.

9. The method for the production of a zeolite suspension according to claim 6, wherein the surfactant comprises:
   (a) an amphipathic tri-block copolymer that is polyethylene oxide-polypropylene oxide-polyethylene oxide including L series of L31, L35, L43, L44, L61, L62, L62D, L62LF, L64, L81, L92, L10, L101 and L121, P series of P65, P84, P85, P103, P104, P105 and P123, F series of F38, F68, F68LF, F77, F87, F88, F98, F108 and F127 or R series of 10R5, 17R2, 17R4, 25R2, 25R4 and 31R1; or
   (b) a di-block copolymer that is $C_nH_{2n+1}(OCH_2CH_2)_xOH$, wherein n is an integer of 12 to 18 and x is an integer of 2 to 100; or
   a mixture of (a) and (b).

10. The method for the production of a zeolite suspension according to claim 6, wherein the surfactant comprises:
    (c) alkyltrimethyl ammonium bromide including $C_{16}H_{33}N(CH_3)_3Br$(HTMABr) or alkyltriethyl ammonium bromide including $C_{16}H_{33}N(C_2H_5)_3Br$ (HTEABr); or
    (d) alkyltrimethyl ammonium chloride including $C_{12}H_{25}N(CH_3)_3Cl(C_{12}TAC)$, $C_{14}H_{29}N(CH_3)_3Cl$ ($C_{14}TAC$) and $C_{18}H_{37}N(CH_3)_3Cl(C_{18}TAC)$; or
    a mixture of (c) and (d).

11. The method for the production of a zeolite suspension according to claim 6, wherein
    the alcohol-based organic solvents are selected from the group consisting of 1-propanol, 2-propanol, 1-butanol and 2-butanol;
    the amide-based organic solvents are selected from the group consisting of N,N-dimethylformamide, N,N-dimethylacetamide and N-methylpyrrolidinone; and
    the ketone-based organic solvents are selected from the group consisting of acetone and methyl ethyl ketone.

12. A method for the production of a zeolite suspension, comprising:
    aging a synthesized solution comprising TEOS, TBAOH, water and alcohol;
    subjecting the aged solution to hydrothermal crystallization treatment to produce MEL-type zeolite nanocrystals;
    mixing a composition comprising a surfactant dissolved in at least one organic solvent or a mixed solvent of alcohol-based organic solvents, amide-based organic solvents and ketone-based organic solvents with a zeolite nano-crystal suspension comprising the MEL-type zeolite nanocrystals to obtain a mixed solution; and
    allowing a methyl group to exist in the mixed solution to produce a zeolite suspension.

13. The method for the production of a zeolite suspension according to claim 12, wherein the methyl group has a volume fraction of 1 to 10% based on the zeolite nano-crystal suspension.

14. The method for the production of a zeolite suspension according to claim 12, wherein the methyl group comprises at least one member selected from the group consisting of methyltriethoxysilane, dimethyldiethoxysilane and trimethylethoxysilane.

15. The method for the production of a zeolite suspension according to claim 12, wherein the surfactant has a ratio of 0.1 to 1.5% by weight based on at least one organic solvent or mixed solvent.

16. The method for the production of a zeolite suspension according to claim 12, wherein the composition has a concentration of 5 to 50% based on the zeolite nano-crystal suspension.

17. The method for the production of a zeolite suspension according to claim 12, wherein the surfactant comprises:
    (a) an amphipathic tri-block copolymer that is polyethylene oxide-polypropylene oxide-polyethylene oxide including L series of L31, L35, L43, L44, L61, L62, L62D, L62LF, L64, L81, L92, L10, L101 and L121, P series of P65, P84, P85, P103, P104, P105 and P123, F series of F38, F68, F68LF, F77, F87, F88, F98, F108 and F127 or R series of 10R5, 17R2, 17R4, 25R2, 25R4 and 31R1; or
    (b) a di-block copolymer that is $C_nH_{2n+1}(OCH_2CH_2)_xOH$, wherein n is an integer of 12 to 18 and x is an integer of 2 to 100; or
    a mixture of (a) and (b).

18. The method for the production of a zeolite suspension according to claim 12, wherein the surfactant comprises:
    (c) alkyltrimethyl ammonium bromide including $C_{16}H_{33}N(CH_3)_3Br$(HTMABr) or alkyltriethyl ammonium bromide including $C_{16}H_{33}N(C_2H_5)_3Br$ (HTEABr); or
    (d) alkyltrimethyl ammonium chloride including $C_{12}H_{25}N(CH_3)_3Cl(C_{12}TAC)$, $C_{14}H_{29}N(CH_3)_3Cl$ ($C_{14}TAC$) and $C_{18}H_{37}N(CH_3)_3Cl(C_{18}TAC)$; or
    a mixture of (a) and (b).

19. The method for the production of a zeolite suspension according to claim 12, wherein
    the alcohol-based organic solvents are selected from the group consisting of 1-propanol, 2-propanol, 1-butanol and 2-butanol;
    the amide-based organic solvents are selected from the group consisting of N,N-dimethylformamide, N,N'-dimethylacetamide and N-methylpyrrolidinone; and
    the ketone-based organic solvents are selected from the group consisting of acetone and methyl ethyl ketone.

* * * * *